United States Patent

Arimilli et al.

[11] Patent Number: 6,141,714
[45] Date of Patent: Oct. 31, 2000

[54] METHOD AND APPARATUS FOR EXECUTING SELF-SNOOPED UNRESOLVABLE SYSTEM BUS OPERATIONS

[75] Inventors: Ravi Kumar Arimilli; Derek Edward Williams, both of Austin; John Michael Kaiser, deceased, late of Cedar Park, all of Tex., by Eileen T. Kaiser, independent adminstratrix

[73] Assignee: International Business Machines Corporation, Armonk, N.Y.

[21] Appl. No.: 09/114,209

[22] Filed: Jul. 13, 1998

[51] Int. Cl.[7] .................................................. G06F 13/00
[52] U.S. Cl. ........................................ 710/107; 711/146
[58] Field of Search ............................. 710/107; 711/146

[56] References Cited

U.S. PATENT DOCUMENTS

| | | | |
|---|---|---|---|
| 5,553,266 | 9/1996 | Metzger et al. | 711/146 |
| 5,781,757 | 7/1998 | Deshpande | 711/146 |
| 5,797,026 | 8/1998 | Rhodehamel et al. | 711/146 |
| 5,829,040 | 10/1998 | Son | 711/146 |
| 5,926,830 | 7/1999 | Feiste | 711/122 |

Primary Examiner—Glenn A. Auve
Attorney, Agent, or Firm—Mark E. McBurney; Richard A. Henkler

[57] ABSTRACT

A method and apparatus for preventing the occurrence of deadlocks from the execution of unresolvable system bus operations. In general, each snooper speculatively accepts a given operation when it has a snoop buffer available. However, rather than unconditionally processing the operation, the snooper waits to determine if another participant retried the operation due to unavailability of a snoop buffer. If some snooping participant retrys an operation, all snoopers that speculatively accepted an operation for processing abandon said operation. If no snooping participant retrys the operation, sufficient snooping resources were available for all necessary caches to begin processing the operation and the initiator can consider the operation completed. In other words, no operation is processed until all the necessary snooping resources are available to accept the operation. This prevents the system from getting into the ping-pong deadlock. Snoopers can safely assume that each presentation of an operation must be propagated and that no operation will have been fully or partially processed by some other snooper. The operation cannot proceed until all of the available resources are available and once available, the operation is propagated only once by those snooping resources.

17 Claims, 4 Drawing Sheets

METHOD AND APPARATUS FOR EXECUTING SELF-SNOOPED UNRESOLVABLE SYSTEM BUS OPERATIONS

CROSS REFERENCE TO RELATED APPLICATIONS

The present patent application is related to Ser. No. 09/004,144, entitled "METHOD AND APPARATUS FOR EXECUTING MULTIPLY-INITIATED MULTIPLY-SOURCED VARIABLE DELAY SYSTEM BUS OPERATIONS" which is hereby incorporated by reference herein.

The present patent application is related to Ser. No. 09/004,146, entitled "METHOD AND APPARATUS FOR EXECUTING SINGLY-INITIATED, MULTIPLY-SOURCED VARIABLE DELAY SYSTEM BUS OPERATIONS" which is hereby incorporated by reference herein.

The present patent application is related to Ser. No. 09/004,149, entitled "METHOD AND APPARATUS FOR EXECUTING SINGLY-INITIATED, SINGLY-SOURCED VARIABLE DELAY SYSTEM BUS OPERATIONS" which is hereby incorporated by reference herein.

The present patent application is related to Ser. No. 09/004,148, entitled "METHOD AND APPARATUS FOR EXECUTING MULTIPLY-INITIATED, MULTIPLY-SOURCED VARIABLE DELAY SYSTEM BUS OPERATIONS" which is hereby incorporated by reference herein.

The present patent application is related to Ser. No. 09/004,137, entitled "METHOD AND APPARATUS FOR EXECUTING MULTIPLY-INITIATED, SINGLY-SOURCED VARIABLE DELAY SYSTEM BUS OPERATIONS" which is hereby incorporated by reference herein.

The present patent application is related to Ser. No. 09/004,147, entitled "METHOD AND APPARATUS FOR EXECUTING VARIABLE DELAY SYSTEM BUS OPERATIONS OF DIFFERING CHARACTER USING SHARED BUFFERS" which is hereby incorporated by reference herein.

BACKGROUND

1. Field of the Present Invention

The present invention generally relates to data processing systems, and more specifically, to methods and apparatuses residing in such systems that prevent the occurrence of deadlock from the execution of unresolvable system bus operations from producing deadlock.

2. History of Related Art

The evolution of the computer industry has been driven by the insatiable appetite of the consumer for ever increased speed and functionality. One species which has evolved from the above is the multi-processor computer.

Multi-processor systems, in similarity to other types of computer systems, have many different areas that are ripe for improvements. One such area is the processing of variable delay system bus operations.

Modern multi-processor systems typically include a number of processing elements, and a main memory, each of which are connected by a series of buses that ultimately terminate in a common system bus. The processing elements usually include a processor having a pre-determined amount of on-board cache and, in some cases, a cache hierarchy. The cache hierarchy, typically, includes a number of caches (e.g. level 0–2) which are interposed between the processor and the common system bus.

In general, operations, in such multi-processor systems, are performed by the processor, residing at the top of a cache hierarchy, placing an operation on the bus between the processor and the first off-board cache. The first off-board cache then propagates the operation, if necessary, to the next lower level cache, if it exists, which then repeats the propagation down the cache hierarchy, if necessary, until the operation finally arrives at the system bus.

Once the operation has arrived at the system bus, it is then snooped by all the caches monitoring the system bus. After a snooping cache detects an operation, it must determine whether or not the execution of the snooped operation can proceed. A cache may be unable or refuse to accept (execute) a snooped operation for any number of reasons. For example, the resources necessary to execute an operation, such as the state machines to process the snooped operation may be busy with other work and unable to process the snooped operation. In general, most system bus protocols allow any operation to be refused when a bus participant is unable to process the operation. If the snooping cache cannot process the operation, then it will send a "RETRY" signal on the system bus. The RETRY signal informs the initiator of the operation that execution thereof was unsuccessful, and that the operation should be re-tried, if still necessary, at a later point in time.

The amount of time that a participant has in order to make a decision concerning the acceptance of a snooped operation, and to send a snoop response (e.g. "RETRY") is usually fixed for any given system via the bus protocol.

Furthermore, operations in such multiprocessors typically fall into two classes: resolvable and unresolvable. In what follows, an operation is considered resolvable if the lowest level caches can examine the operation and determine, without traversing up their respective cache hierarchies, whether or not the operation must be presented to the cache hierarchy. In other words, if a lowest level cache can examine a system bus operation and determine, in a fixed, usually short period of time, that the operation need not be propagated up the cache hierarchy, the operation is resolvable.

Unresolvable operations are those operations that the lowest level cache cannot determine, in a fixed, usually short, period of time, whether or not the operation must be presented to the cache hierarchy.

For unresolvable operations, the lowest level cache usually must assume that the operation must be propagated up the cache hierarchy to insure the correct operation of the system. In other words, whenever presented with an unresolvable operation, a lowest level cache must assume that this operation is a new operation and must be propagated up the cache hierarchy to insure the correct operation of the system.

In example, the PowerPCTM architecture uses an ICBI instruction to invalidate a block of instructions in the processor instruction caches at the tops of the cache hierarchies in a system. Typically, caches below the processor are unified, that is they hold both instructions and data, and also do not maintain information on which previously loaded blocks have been placed in the instruction cache of the processor. In such a system, the ICBI instruction is unresolvable. When a lowest level cache snoops an ICBI instruction, the lowest level cache has no specific information as to whether the block in question is present in the instruction cache at the top of its' hierarchy. As such, the lowest level cache must assume that the ICBI operation must be propagated up the processor instruction cache at the top of the hierarchy in order to insure proper system operation (if the block is present in the processor instruction cache, it must be invalidated).

Note, however, that the ICBI instruction does not have to be unresolvable, and that the above example is for illustrative purposes and should not be construed in a limiting sense. If the lower level caches (below the processor) maintain information indicating which blocks have been loaded into the processor instruction cache, it is then possible to determine, at the lowest level cache, whether or not any given ICBI must be propagated up any given hierarchy (if the block is not present in the instruction cache of the processor at the top of a given hierarchy, it is unnecessary to propagate the ICBI operation up the given hierarchy) and the instruction is therefore resolvable.

Unfortunately, if the lowest level caches in a system have finite buffering resources to process unresolvable operations, a deadlock scenario can occur.

For example, consider a system with three processors and their respective multi-level cache hierarchies, assuming that each lowest level cache has only one buffer to process unresolvable operations.

To begin, all snoop buffers are idle and an unresolvable operation, herein called X, is placed on the system bus by one participant (i.e. an initiator) and snooped by two other participants (recipients). When this operation, X, is initiated onto the system bus, both recipients snoop the operation, determine that they have a buffer to process the operation, and therefore accept the operation for processing and do not retry the operation. As far as the initiator is concerned, the operation has succeeded and the initiating participant can move on to subsequent operations.

In the snooping participants, however, the snoop buffer that accepted the operation must undertake the task of propagating the operation up its' respective cache hierarchy. This process typically takes a variable amount of time, and therefore it is common for the snoop buffers, that accepted a particular operation, to finish the steps necessary to propagate the operation up the cache hierarchy at different times.

Assume that one of the snooping participants, hereinafter called A, finishes propagating the initial operation, X, up its' respective cache hierarchy, and therefore, has an available snoop buffer.

At this point, the initiator issues another unresolvable bus operation, herein called Y (first attempt). Snooping participant A detects the operation and loads its' snoop buffer to begin processing the operation. Simultaneously, the other snooping participant, hereinafter called B, detects the operation and signals retry due to the fact that it has no buffer available to process the new operation (Y). Snooping participant A has the new operation (Y) in its' buffer for processing and snooping participant B has the original operation (X) in its snoop buffer processing.

At this point, snooping participant B finishes the original operation (X) and therefore snooping participant B's snoop buffer is available. Snooping participant A is processing the second operation (Y). The initiator, in response to the initial retry indication from snooping participant B, re-initiates the second operation (Y) on the system bus (second attempt). Recall that the operation is not complete until it is not retried on the system bus. Snooping participant B will accept the operation and not retry. Snooping participant A, since its' snoop buffer is busy, will retry the operation and once again both participants are processing the second operation (Y).

Snoop participant A is processing the first attempt of the operation and snoop participant B is processing the second attempt. Snoop participant A then finishes processing operation (Y). At this point, the initiator places the operation (Y) on the bus again (third attempt). Snooper A will accept the operation and begin processing it anew. Notice that the operation has already been processed by participant A, but is repeated here because the snooper cannot determine the difference between the initial attempt of the operation and subsequent attempts necessitated by retrys. At this point both participants are processing the operation again. Snooper A is processing the third attempt and snooper B is processing the second attempt.

Further, in the current example, assume that snooper B now finishes processing the operation. At this point, snooper B is available and snooper A is processing the operation. This is the same system state as occurred when the first operation (X) completed after the second operation (Y) was first initiated onto the system bus: snooper A processing operation (Y) and snooper B available. At this point, the sequence of events above can be repeated and this process can repeat indefinitely.

The essential difficulty is due to the fact that snoopers cannot ascertain, for a given operation, whether it is being initiated for the first time or is being re-initiated due to retrys caused by the lack of availability of buffers in other snoopers. In such a situation, the snooper or snoopers that are busy "ping-pong" with the snooper or snoopers that are not busy and the process repeats indefinitely. This type of repetition is known in the industry as a "Ping-Pong deadlock".

Note that, in general, a Ping-Pong deadlock scenario can exist when there are more than two recipients as described above. In the most general case, a Ping-Pong deadlock can occur whenever one or more participants have an available snoop buffer and one or more participants do not have a snoop buffer available when an operation is re-presented by the initiator. The snooper or snoopers that have an available snoop buffer can change dynamically between re-initiations of the operation. This makes a Ping-Pong deadlock more likely to occur in systems with larger numbers of participants.

It is also possible to encounter a Ping-Pong deadlock if the snoopers have a plurality of snooping buffers. In this case it is only necessary to simultaneously have enough unresolvable operations being processed to cause some of the snooping participant's snoop buffers to fill while some others have a snoop buffer available to begin the ping-pong process between available and busy buffers.

Another difficulty caused by a Ping-Pong deadlock is that an operation can be propagated up a given cache hierarchy a number of times in response to one attempt to execute the operation by the processor. A processor could execute an operation that proceeds to an initiator and enters a ping-pong deadlock case. Even if, due to timing, the system "escapes" from the ping-pong deadlock sequence, it is possible that the operation was propagated up one or more of the cache hierarchies a number of times. This can lead to spurious system operation. Certain operations have "side effects" that preclude them from being executed twice. That is to say, an operation with side effects can execute differently depending on the state of the system, which is changed by the operation, and it is therefore essential that an operation with side-effects be presented only once to the targeted processors per execution of that operation by the initiating processor. Any means for correcting ping-pong deadlocks due to unresolvable bus operations must also insure that operations are not repeated at the target processors if the unresolvable operations have side effects.

It would, therefore, be a distinct advantage to have a method and apparatus that would allow execution of unresolvable system bus operations while avoiding a Ping-Pong deadlock and preventing replication of operations. The present invention provides such a method and apparatus.

SUMMARY OF THE PRESENT INVENTION

The present invention is a method and apparatus for preventing the occurrence of deadlocks from the execution of unresolvable system bus operations. In general, each snooper speculatively accepts a given operation when it has a snoop buffer available. However, rather than unconditionally processing the operation, the snooper waits to determine if another participant retried the operation due to unavailability of a snoop buffer. If some snooping participant retrys an operation, all snoopers that speculatively accepted an operation for processing abandon the operation. If no snooping participant retrys the operation, sufficient snooping resources were available for all necessary caches to begin processing the operation and the initiator can consider the operation completed. In other words, no operation is processed until all the necessary snooping resources are available to accept the operation. This prevents the system from getting into the ping-pong deadlock.

Snoopers can safely assume that each presentation of an operation must be propagated and that no operation will have been fully or partially processed by some other snooper. The operation cannot proceed until all of the available resources are available and once available, the operation is propagated only once by those snooping resources.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
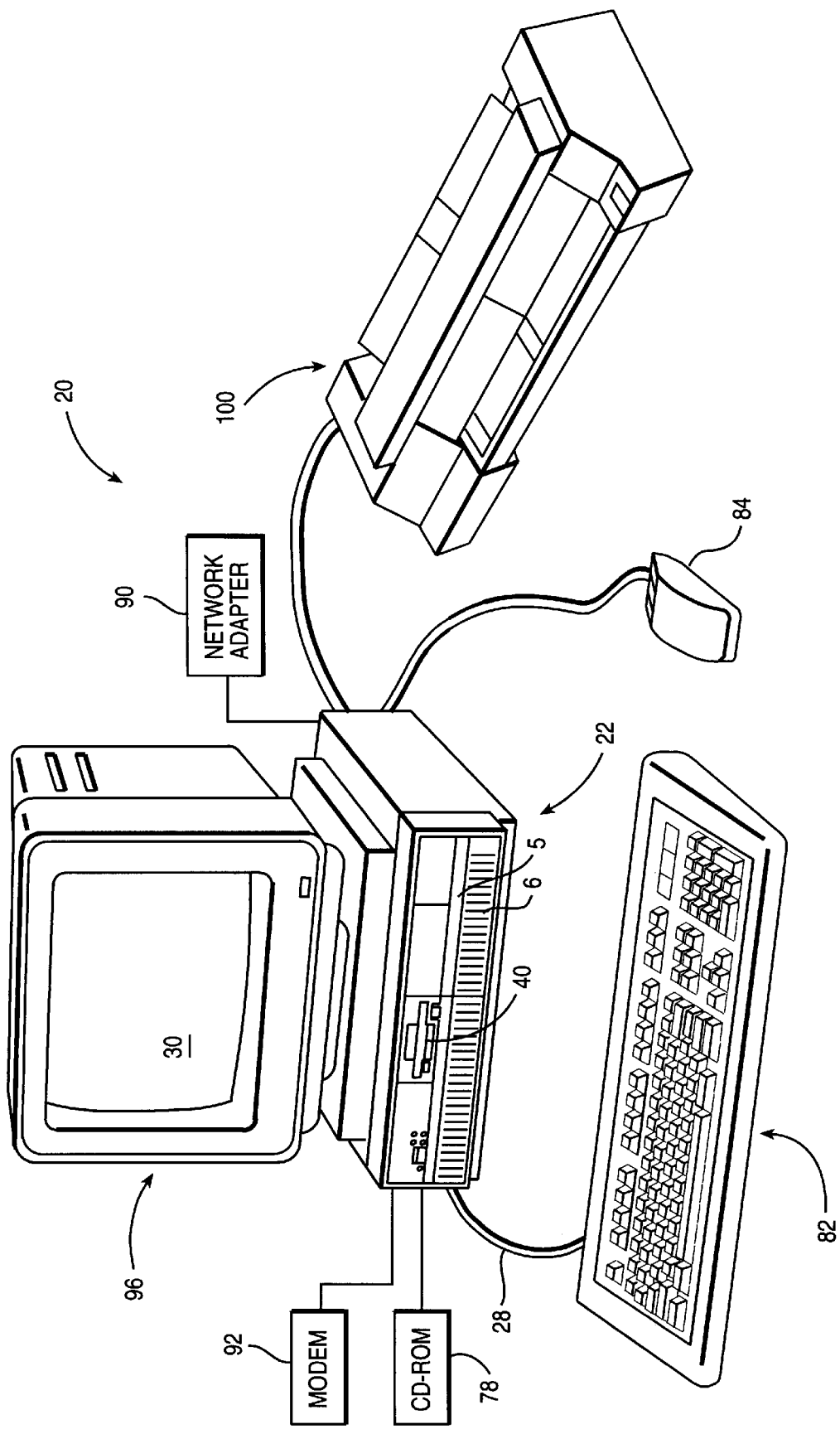
FIG. 1 is a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or by a mouse as illustrated. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
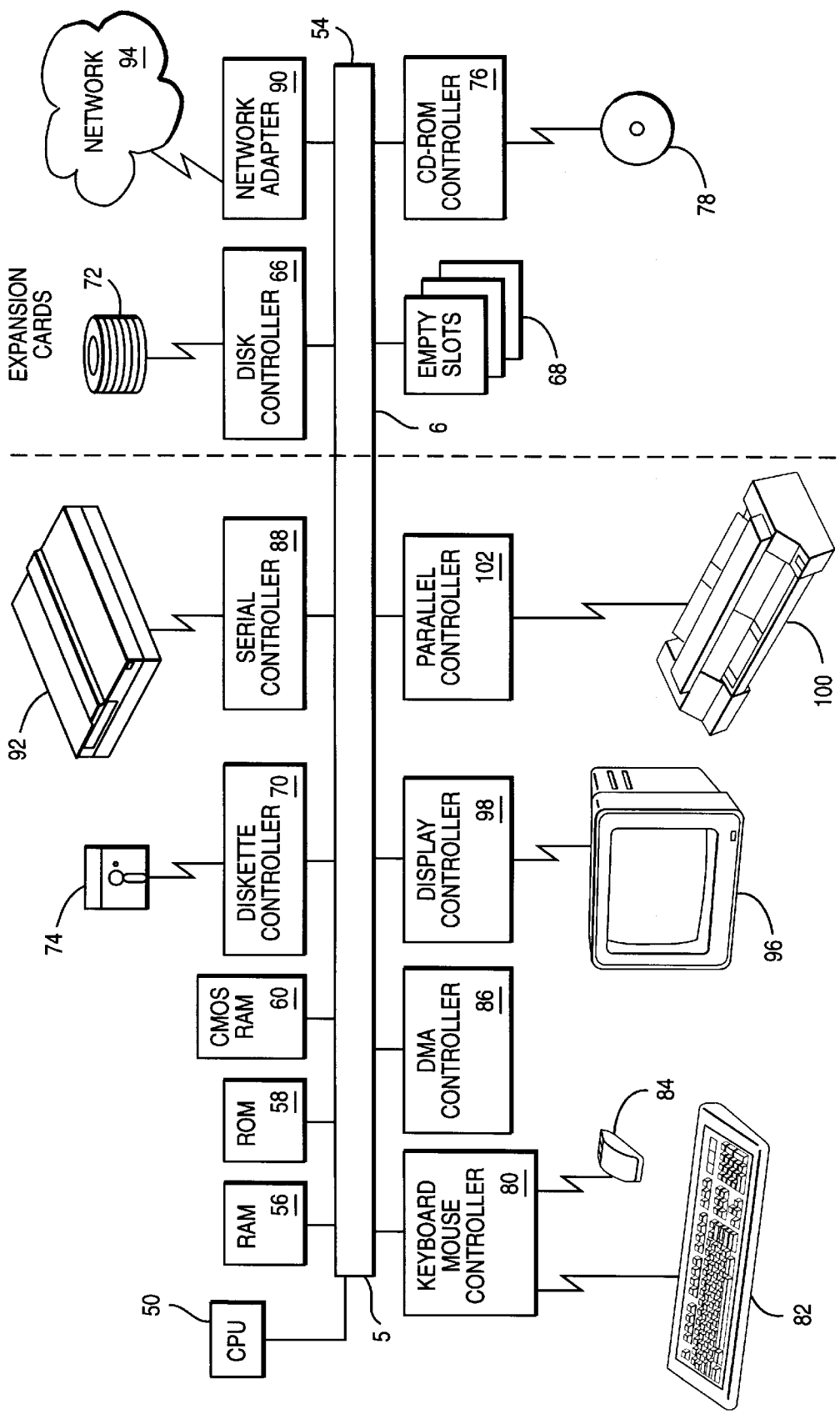
FIG. 2 is a high level block diagram illustrating selecting components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. Rooms contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive. CD-ROM controller 76 may be included in data processing 20 for reading data from CD-ROM 78 (compact disk read only memory). Such CD-Rooms use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software or information, such as a server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other types of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Figure 3:
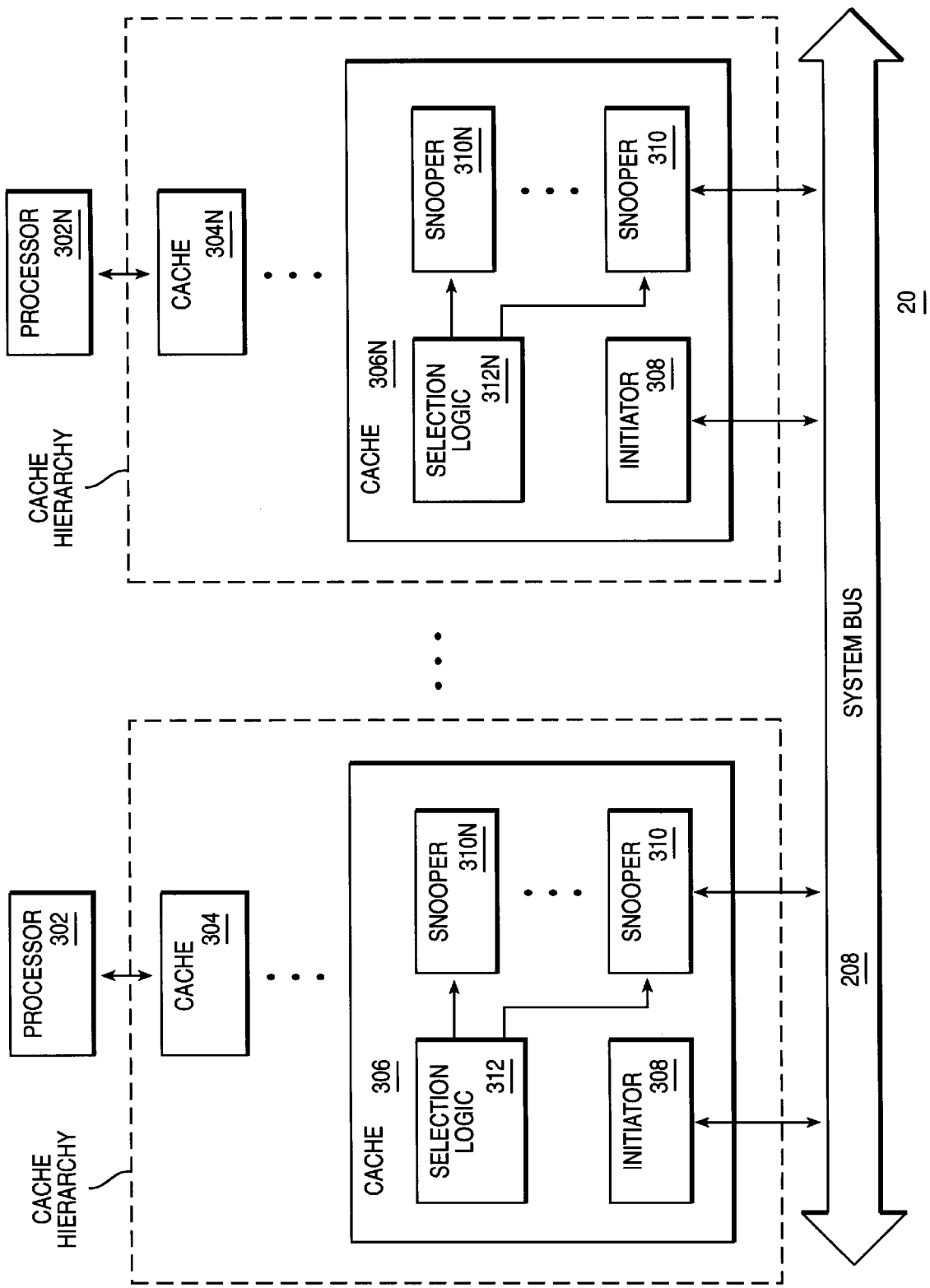
FIG. 3 is a schematic diagram illustrating in greater detail a preferred embodiment of the computer system of FIG. 1 according to the teachings of the present invention.

Reference now being made to FIG. 3 a schematic diagram is shown illustrating in greater detail a preferred embodiment of the computer system 20 of FIG. 1 according to the teachings of the present invention. As shown, the preferred embodiment is a multi-processor (302-$n$) environment that includes a cache hierarchy (304-$n$ to 306-$n$). The last cache in the hierarchy (i.e. the one closest to the system bus 208) (306-$n$) operates in accordance with the protocols of the present invention. Cache 306 is representative of caches 306-$n$, and therefore, the discussion hereinafter with respect to cache 306 is equally applicable to caches 306$n$. Cache 306 includes an initiator 308, a plurality of snoopers 310-$n$ and selection logic 312. Each cache 306$n$ can have a differing number of snoopers 310-$n$.

The protocol of the preferred embodiment of the present invention is divided into two separate parts: an initiator protocol and a snooper protocol. The initiator and snooper protocols are generally independent of one another, and communicate by passing transactions over the system bus 208. In the preferred embodiment of the present invention, these protocols are implemented via the initiator 308 and snooper 310.

The protocol for the initiator 308, for a given operation, includes the following:

1) the operation is presented to the initiator 308 from the cache above this one (e.g. cache 304); and 2) In response to the above, the initiator 308 presents the operation unto the system bus 208 until it succeeds without RETRY.

The initiator 308 usually accepts multiple different operations, either differing instances of a given type of operation, differing types of operations, or a combination of these, at a time before any given operation is completed. This forms a set of operation in progress. Typically, the initiator cycles through operations in this set according to some arbitration policy designed to prevent higher level system deadlocks and facilitate the correctness and performance of the overall computer system. No operation is abandoned, but rather, all operations accepted by the initiator 308 are eventually carried through to completion.

Figure 4:
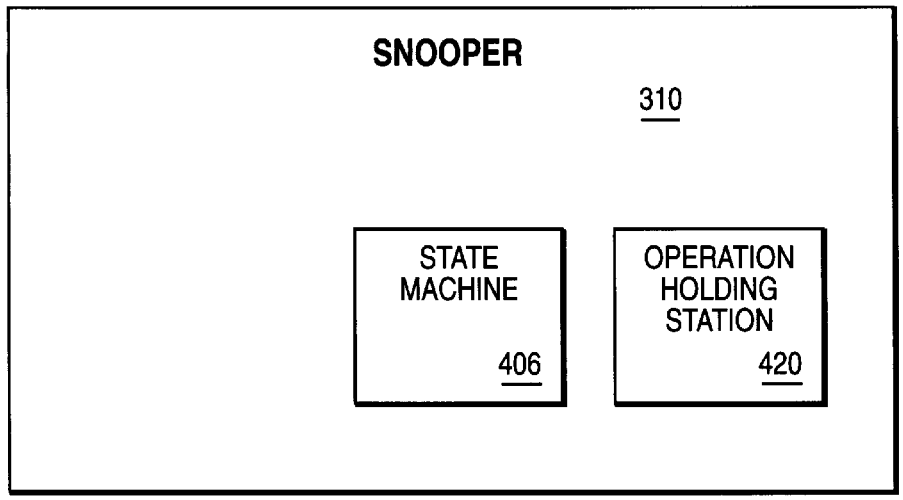
FIG. 4 is a block diagram illustrating in greater detail the snooper of FIG. 3 according to the basic protocol as defined by the teachings of the present invention.

Reference now being made to FIG. 4, a block diagram is shown illustrating in greater detail snooper 310 of FIG. 3 according to the teachings of the present invention. Snooper 310 includes a state machine 406, and an operation holding station 420. The operation holding station 420 contains the information for the snooped operation from the system bus 208 that must be propagated up the cache hierarchy in order to perform the given operation. It should be noted that the operation holding station 420 is only valid if the state machine 406 is not in the IDLE state. State machine 406 implements the snooper protocol which is described in greater detail in connection with FIG. 5 hereinafter.

Figure 5:
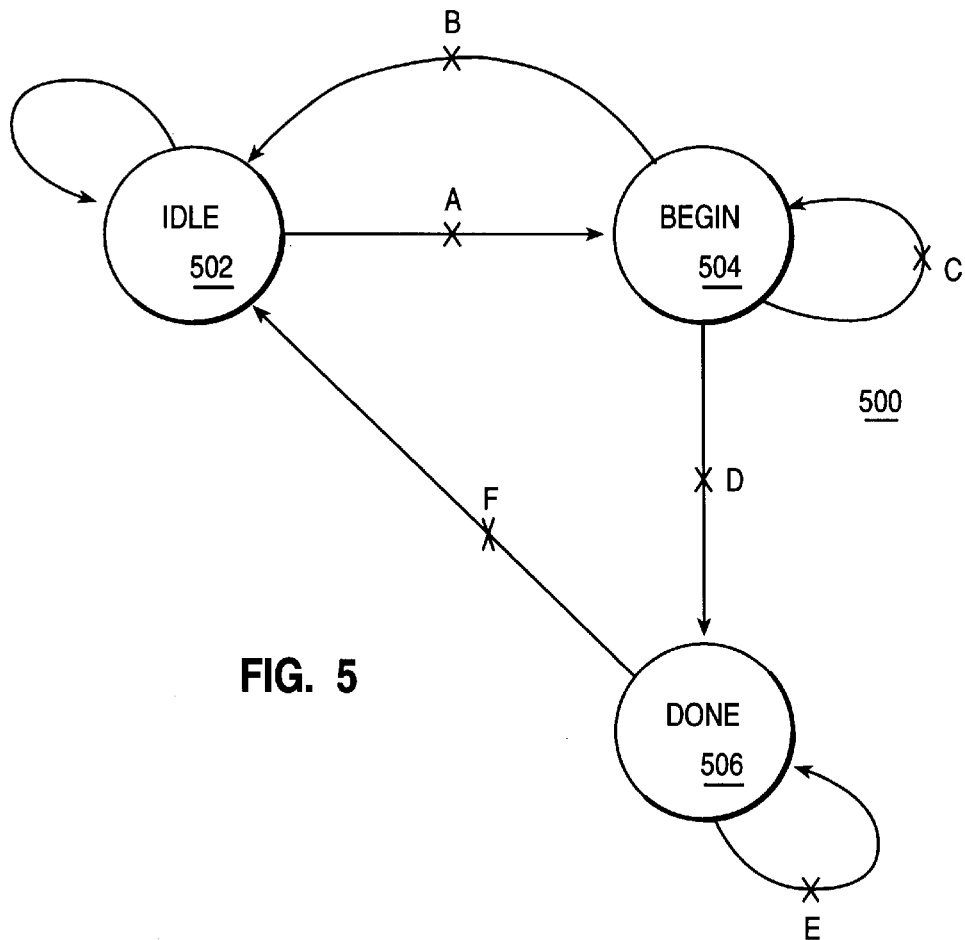
FIG. 5 is a state diagram illustrating the implementation of the state machine of FIG. 4 for executing the basic snooper protocol according to the teachings of the present invention.

Reference now being made to FIG. 5, a state diagram 500 is shown illustrating the implementation of state machine 406 of FIG. 4 for executing the snooper protocol according to the teachings of the present invention.

The snooper state machines 406 can proceed according to two distinct paths depending on whether the operation snooped is retried. As shown in FIG. 5, state machine 406 moves through the following three phases in the protocol when the operation is not retried:

1) waiting for an operation (idle (502));
2) waiting to determine if a speculatively accepted operation will be retried by another snooper (begin (504)), and
3) propagating the operation up the cache hierarchy (done (506)).

However, when the snooped operation is retried by another snooper, the state machine 406 proceeds through a subset of these phases:

1) waiting for an operation (idle (502));
2) waiting to determine if a speculatively accepted operation will be retried by another snooper (begin (504)).

The differences between these two cases will be described in greater detail hereinafter.

In order to further clarify the various aspects of the preferred embodiment of the present invention, state machine 406 is explained hereinafter in connection with caches 306-n.

When an operation to be processed by the mechanism of the current invention is snooped on the system bus, two distinct cases occur. In the first case, the snooped operation is sourced from the initiator of the same cache. This is referred to as a "local" operation. In the second case, the snooped operation is sourced from an initiator in a different cache. This is referred to as a "foreign" operation. A snooper 310 can determine if an operation is "local" or "foreign" by a number of means including side-band signals from the initiator 308 to the snoopers 310-n, tagging system bus operations with a source indication, or other techniques.

Initially, all snoopers 310-n begin in the IDLE state (502). When an operation, processed by the present invention, is placed on the system bus 208, this is detected by selection logic 312. If the selection logic 312 determines that the operation is not a local operation and that at least one snooper 310 is available to potentially process the operation, the selection logic 312 will select a snooper 310-n to activate to begin processing the operation. It is not necessary that the selection logic units 312-n in each cache necessarily select the same snooper 310 from among the set of snoopers 310-n. It is only necessary that the selection logic units 312-n choose some snooper 310 in each necessary cache 306-n from among the set of snoopers 310-n that are available. The selected snooper (310) speculatively loads the snooped operation, and proceeds to the BEGIN (504) state through arc A.

In the BEGIN (504) state, the snooper 310 waits to determine if the operation will be retried by another cache 306-n. The determination of whether an operation was retried may take sufficient time to require state machine 406 to "hover" for a number of cycles in the begin (504) state using arc C. If the snooped operation is retried, sufficient snooping resources were not available in all the necessary caches to process the operation and the snooper 310 must abandon the speculatively loaded operation. This is accomplished by having the state machine 406 transition from the begin (504) state to the idle (502) state through arc B.

However, if the operation is not retried, the state machine 406 proceeds from the BEGIN (504) state to the DONE (506) state through arc D. In the DONE (506) state, the snooper 310 takes whatever actions are necessary to propagate the snooped operation up its' respective cache hierarchy. Note that no operation is propagated up the cache hierarchies until all the snooping resources needed to propagate the operation up the necessary cache hierarchies are available simultaneously as signaled by the absence of retry on system bus 208. Furthermore, the operation is propagated up the necessary cache hierarchies only once due to the single transition of the snoopers from the BEGIN (504) to DONE (506) states.

However, the amount of time each snooper needs to propagate the operation up its respective cache hierarchy can and usually does vary. Arc E of the state machine 406 is used to allow the state machine to wait until the steps necessary to propagate the operation up the cache hierarchy are completed. Once these steps are completed state machine 406 proceeds from the DONE (506) state to the IDLE (502) state through arc F and is available to process a new operation.

However, if the selection logic 312 determines, upon snooping an operation processed by the current invention, that no snooper 310-n is available to process the operation, then selection logic 312 will retry the operation. This retry signals to the initiator 308 that the operation must be retried again at a later time and signals to any snoopers 310-n that have speculatively loaded the operation for processing that it should be abandoned.

This protocol avoids deadlock by preventing any snooper from partially or fully processing an operation before sufficient resources are available to simultaneously process the operation at each necessary lowest level cache (306-n) in the system. Further, snooped operations are propagated up the cache heirarchy only once. This occurs when the sufficient snooping resources are available and the operation is not retried on the system bus.

Finally, each cache can have a variable number of snoopers 310-n. If a particular cache hierarchy is asymmetric with others, it may be advantageous to provide a differing number of snoopers 310 to lower level caches 306-n. Progress on processing operations is impeded when snoop buffers are full (saturated) in a cache that is needed to process an operation. If a given cache hiearchy, due to a deeper hierarchy or other factors, processes operations at a slower rate, then that cache hierarchy's lowest level cache should be provided with additional snoopers 310-n to prevent that cache hierachy from saturating with snoop operations before the other cache hierarchies in the system. If one cache hierarchy processes operations slower than other cache hierarchies and is provided with the same number of buffers as the other caches, then that cache hierachy can become a bottleneck to performance and cause snoopers to be underutilized in other cache hierarchies. The system and mechanism of the present invention allows for differing numbers of snoopers 310-n to meet the varied performance needs of asymmetric systems.

It is assumed in the description above that the effects of the operation are completed on the local processor 302-n before the operation is presented to the initiator 308. As such, the operation does not need to be propagated from the system bus 208 to the initiating processor 302-n. Therefore, the initiating processor's (302-n) lowest level cache (306-n) will not activate a snooper 310 when snooping a local operation.

It is possible, however, to have a system in which operations are not completed on the local processor 302-n before being presented to the initiator 308. In such a system, the snooper state machine must be altered to propagate the operation back to the initiating processor 302-n. To perform this alteration, the snooper state machines are altered to move from the IDLE (502) to BEGIN (504) state even for a local operation. This will cause a snooper (310) in the initiating cache to propagate the operation to the processor at the top of the local cache hierarchy.

The appropriate implementation choice depends on the whether the operation is completed on the local processor 302-*n* before being presented to the initiator 308 or if a snooper 310 is expected to present the operation to the local processor 302-*n*. Having a snooper 310 present the operation to the local processor 302-*n* is referred to as "self-snooping" as is a technique well known to those skilled in the art. Note further that it is possible to combine self-snooped and non-self snooped unresolvable bus operations. In such a system, the state machine 406 and selection logic 312 of each lowest level cache must be designed to determine if an operation is self-snooped and take appropriate actions with respect to initiating retry and starting a snooper 310 for each differing type of instruction processed by the mechanism of the current invention.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims

What is claimed is:

1. An apparatus for processing system bus operations to avoid deadlock conditions, the apparatus comprising:
   a plurality of processors each for executing instructions;
   memory for storing data;
   a system bus for transferring the stored data to the processors for execution, and for communicating operations to each of the processors;
   a first cache for a first one of the processors for processing snooped operations, the first cache including:
      first means for ensuring, by monitoring said system bus for retry signals, that each snooped operation is accepted by each one of the processors via their at least one cache before each snooped operation is processed; and
   a second cache for a second one of the processors for processing snooped operations, the second cache including:
      second means for ensuring, by monitoring said system bus for retry signals, that each snooped operation is accepted by each one of the processors via their at least one cache before each snooped operation is processed.

2. The apparatus of claim 1 wherein the first means for ensuring includes:
   a first plurality of snoopers for processing each snooped operation.

3. The apparatus of claim 2 wherein the second means for ensuring includes:
   a second plurality of snoopers for processing each snooped operation which is greater than a number of snoopers for the first cache.

4. The apparatus of claim 2 wherein the first means for ensuring includes:
   first selection means for selecting one of the snoopers to process each one of the snooped operations.

5. The apparatus of claim 4 wherein the second means for ensuring includes:
   second selection means for selecting one of the snoopers to process each one of the snooped operations.

6. The apparatus of claim 5 wherein the first selection means includes:
   means for asserting a retry signal on the bus when all the snoopers are busy.

7. The apparatus of claim 6 wherein the second selection means includes:
   means for asserting a retry signal on the bus when all the snoopers are busy.

8. The apparatus of claim 7 wherein each one of the first plurality of snoopers includes:
   means for detecting when a retry is asserted on the bus for an accepted operation; and
   means for discarding the accepted operation upon the detection of the retry signal for the accepted operation.

9. The apparatus of claim 8 wherein each one of the second plurality of snoopers includes:
   means for detecting when a retry is asserted on the bus for an accepted operation; and
   means for discarding the accepted operation upon the detection of the retry signal for the accepted operation.

10. The apparatus of claim 9 wherein the first cache includes:
    means for initiating an operation onto the system bus until all processors have accepted the operation via their at least one cache.

11. The apparatus of claim 10 wherein the second cache includes:
    means for initiating an operation onto the system bus until all processors have accepted the operation via their at least one cache.

12. The apparatus of claim 11 wherein each one of the first plurality of snoopers includes:
    means for detecting when an operation is initiated by the first cache; and
    means for transmitting the operation to the first processor.

13. The apparatus of claim 12 wherein said plurality of first snoopers for processing the detected operation includes:
    means for accepting the operation without a retry signal; and
    means for processing the operation only after it has been determined that no retry signal was transmitted for the accepted operation.

14. The apparatus of claim 12 wherein said plurality of second snoopers for processing the detected operation includes:
    means for accepting the operation without a transmitting a retry signal; and
    means for processing the operation only after it has been determined that no retry signal was transmitted for the accepted operation.

15. The apparatus of claim 11 wherein each one of the plurality of second snoopers includes:
    means for detecting when an operation is initiated by the second cache; and
    means for transmitting the operation to the second processor.

16. The apparatus of claim 15 wherein said plurality of second snoopers for processing the detected operation includes:
    means for accepting the operation without a retry signal; and
    means for processing the operation only after it has been determined that no retry signal was transmitted for the accepted operation.

17. A method of processing system bus operations to avoid deadlock conditions, said method comprising the steps of:
    executing instructions by a plurality of processors;

storing data in memory;

transferring the stored data to the processors for execution via a system bus, and communicating operations to each of the processors;

processing snooped operations by a first cache for a first one of the processors to ensure that each snooped operation is accepted by each one of the processors via their at least one cache before each snooped operation is processed; and processing snooped operations by a second cache for a second one of the processors to ensure that each snooped operation is accepted by each one of theprocessors via their at least one cache before each snooped operation is processed, wherein said first and second caches monitor said system bus for retry signals to ensure acceptance of each said snooped operation.

* * * * *